(12) United States Patent
Godfrey et al.

(10) Patent No.: US 7,445,591 B2
(45) Date of Patent: Nov. 4, 2008

(54) TREATMENT OF WASTE PRODUCTS

(75) Inventors: Ian Hugh Godfrey, Cumbria (GB);
Martin John Jowsey, Cumbria (GB);
Eric Walter Miller, Cumbria (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 11/538,969

(22) Filed: Oct. 5, 2006

(65) Prior Publication Data

US 2007/0224344 A1   Sep. 27, 2007

Related U.S. Application Data

(63) Continuation of application No. 10/499,283, filed as application No. PCT/GB02/05861 on Dec. 20, 2002, now abandoned.

(30) Foreign Application Priority Data

Dec. 21, 2001  (GB)  ................... 0130593.7

(51) Int. Cl.
*A62D 3/00* (2007.01)
(52) U.S. Cl. .............. 588/257; 588/256; 106/713
(58) Field of Classification Search .......... 588/252, 588/256, 257; 106/713
See application file for complete search history.

(56) References Cited

U.S. PATENT DOCUMENTS

| | | | |
|---|---|---|---|
| 3,988,258 A | * | 10/1976 | Curtiss et al. |
| 4,116,705 A | * | 9/1978 | Chappell ............... 106/DIG. 1 |
| 4,249,949 A | * | 2/1981 | Wooler et al. |
| 4,379,081 A | * | 4/1983 | Rootham et al. ............ 252/628 |
| 4,409,137 A | * | 10/1983 | Mergan et al. .............. 252/632 |
| 4,432,666 A | * | 2/1984 | Frey et al. .................... 405/129 |
| 4,518,508 A | * | 5/1985 | Conner ....................... 210/751 |
| 4,530,723 A | | 7/1985 | Smeltzer et al. ............... 106/90 |
| 4,600,514 A | * | 7/1986 | Conner ....................... 210/751 |
| 4,741,776 A | * | 5/1988 | Bye et al. |
| 4,853,208 A | * | 8/1989 | Reimers et al. ............. 423/659 |
| 4,904,416 A | | 2/1990 | Sudo et al. |
| 5,026,215 A | | 6/1991 | Clarke ......................... 405/266 |
| 5,143,653 A | * | 9/1992 | Magnin et al. .............. 252/628 |
| 5,143,654 A | * | 9/1992 | Kikuchi et al. ............... 252/629 |
| 5,151,126 A | | 9/1992 | Ranc et al. |
| 5,242,603 A | * | 9/1993 | Fan ........................ 405/129.25 |
| 5,256,338 A | * | 10/1993 | Nishi et al. ................. 252/628 |
| 5,640,704 A | | 6/1997 | Snyder et al. ................. 588/4 |
| 5,968,257 A | | 10/1999 | Ahrens |

FOREIGN PATENT DOCUMENTS

| | | | |
|---|---|---|---|
| EP | 6329 | * | 1/1980 |
| EP | 0006329 A1 | | 1/1980 |
| EP | 0202761 A1 | | 11/1986 |
| EP | 0419162 A2 | | 9/1990 |
| EP | 0412913 A1 | | 2/1991 |
| EP | 0 534 385 A1 | | 2/1992 |
| EP | 0709859 A1 | | 5/1996 |
| EP | 0 801 124 A1 | | 10/1997 |
| EP | 0709859 B1 | | 2/2000 |
| FR | 2763584 A1 | | 11/1998 |
| GB | 2 117 753 A | | 10/1983 |
| GB | 2 187 727 A | | 9/1987 |
| JP | 60122398 A | | 6/1985 |
| JP | 61239197 | * | 10/1986 |
| JP | 61239197 A | | 10/1986 |
| JP | 62096899 A | | 5/1987 |
| JP | 62267700 A | | 11/1987 |
| JP | 62277600 A | | 12/1987 |
| JP | 01028254 A | | 1/1989 |
| JP | 040317444 A | | 11/1992 |
| JP | 050208853 A | | 8/1993 |
| JP | 6300893 A | | 10/1994 |

OTHER PUBLICATIONS

"Crystal Chemistry of Portland Cement Hydrates as radioactive waste hosts" Grutzeck et al., Mater Res Lab, Penn State Univ., University Park PA, USA (1984), DOE/ER/45013-2; Order No. DE 84015112-34 pages; Energy Res. Abstr. (1984), 9(19), Abstr No. 37266.*

"The effect of chemically adjusting cement compositions on leachabilities of waste ions", Barnes et al., Advances in Ceramics (1986), 20 (NUcl. Waste Management 2), 313-17.*

(Continued)

*Primary Examiner*—Paul Marcantoni
(74) *Attorney, Agent, or Firm*—Myers Bigel Sibley & Sajovec

(57) ABSTRACT

The invention provides a method for the encapsulation of fine particulate materials which comprises treating these materials with a microfine hydraulic inorganic filler which, typically, comprises a cementitious material, such as Portland Cement. The filler is ground to a much smaller particle size than is normally used in the production of a grout and is provided in the form of an aqueous composition for the treatment of the fine particulate materials by pumping under pressure through these materials such that they become intimately encapsulated. The method is particularly applicable to the treatment of waste materials and, most particularly, waste materials which are encountered in the nuclear industry.

11 Claims, No Drawings

OTHER PUBLICATIONS

"Encapslation of radioiodine in cementitious waste forms", Atkins et al., Materials Research Society Sumposium Proceedings (1990), 176 (Sci. Basis Nucl. Waste Manag. 13) 15-22.*

"Effect of gamma radiation on the microstructure and microchemistry of ggbfs/OPC cement blends", Richardson et al., Mat'ls Research Society Symposium Proceedings (1990), 176 (Sci. Basis Nucl Waste Manag. 13) 31-7.*

"Blast furnace slag cement for stabilizing radioactive and mixed wastes" Sasaki et al., WM '98 PRoceedings, Tuscan AZ, USA, Mar. 1-5, 1998, 1560-68 Publisher: American Nuclear SOciety, La Grange Park Illinois.*

"Alpha Crystalline polyantimonic acid-an adsorbent for radiostrontium, and a potential primaryu barrier in waste repositories", Bilewicz et al., Radiochimica Acta (2001), 89(11—12), 783-784.*

International Preliminary Examination Report (IPER) for International Application No. PCT/GB02/05861 mailed on Mar. 22, 2005.

International Search Report dated Apr. 29, 2003 for corresponding PCT application No. PCT/GB02/05861.

Search Report dated Jun. 28, 2002 for corresponding GB application No. GB 0130593.7.

Atkins et al. "Encapsulation of radioiodine in cementitious waste forms" *Materials Research Society Symposium Proceedings* 176(Sci. Basis Nucl. Wate Manag. 13) 15-22 (1990).

Barnes et al. "The effect of chemically adjusting cement compositions on leachabilities of waste ions" *Advances in Ceramics* 20 (Nucl. Waste Management 2) 313-317 (1986).

Bilewicz et al. "Alpha Crystalline polyantimonic acid-an adsorbent for radiostrontium, and a potential primary barrier in waste repositories" *Radiochemica Acta* 89(11-12):783-784 (2001).

Grutzeck et al. "Crystal Chemistry of Portland Cement Hydrates as radioactive waste hosts" *Mat. Res. Lab.*, Penn State Univ., University Park PA, USA (1984) DOE/ER/45013-2; Order No. DE 84015112 34 pages *Energy Res. Abst.* 9(19) (1984).

Richardson et al. "Effect of gamma radiation on the microstructure and microchemistry of ggbfs/OPC cement blends" *Mat'ls Research Society Symposium Proceedings* 176 (Sci. Basis Nucl. Wate Manag. 13) 31-37 (1990).

Sasaki et al. "Blast furnace slag cement for stabilizing radioactive and mixed wastes" *WM '98 Proceedings*, Tucson AZ, USA 1560-1568 (1998).

* cited by examiner

TREATMENT OF WASTE PRODUCTS

RELATED APPLICATIONS

This application is a continuation application of co-pending U.S. patent application Ser. No. 10/499,283 filed on Jan. 18, 2005 now abandoned, which is a national phase application of PCT International Application No. PCT/GB02/05861, having an international filing date of Dec. 20, 2002, and claiming priority to Great Britain Patent Application No. 0130593.7, filed Dec. 21, 2001, the disclosures of which are incorporated herein by reference in their entireties.

FIELD OF THE INVENTION

This invention relates to a method for the treatment of waste by encapsulation. More specifically, it is concerned with the encapsulation of waste products produced in the nuclear industry by treatment of the wastes with microfine inorganic filler materials.

BACKGROUND TO THE INVENTION

Encapsulation has proved to be an especially favored method for the disposal of certain waste materials; specifically it provides a suitable means for the conversion of these materials into a stable and safe form, which allows for long-term storage and/or ultimate disposal. The technique can find particular application in the nuclear industry, where the highly toxic nature of the materials involved, and the extended timescales over which the toxicity is maintained, are the principal considerations when devising safe disposal methods.

Whilst the technique of encapsulation can be of great value in such circumstances, however, it is known from the prior art that many fine particulate sized waste materials, as well as certain filters which contain ion exchange resins, are particularly problematic to encapsulate. This is a problem which becomes especially important in the nuclear industry where, in view of the nature of the waste products, it is vital to ensure that procedures are completed efficiently and successfully before disposal of the waste products.

Previously, it has been found necessary to treat these problematic materials by removing them from the containers in which they are stored and mixing them in drums with the encapsulation material, or subjecting them to vibro-grouting techniques. Such procedures, involving removal from containers, are invariably difficult, messy and expensive to carry out, and generally give rise to copious amounts of additional waste. Furthermore, there are obvious implications in terms of extra containment requirements and additional plant capacity.

In general, therefore, the situation is unsatisfactory. Indeed, no commercially acceptable means of dealing with such waste materials is yet available which does not rely on the technique of in-drum mixing which, as previously discussed, has several serious practical drawbacks.

The use of cement based injection grouting in the construction industry is well known from the prior art. Thus, EP-A-412913 teaches the use of a Portland Cement based grout in the consolidation of concrete structures affected by fine cracks, providing a cost-effective means of in filling both superficial and deeper fissures and cavities in such structures, including such as buildings, bridges and dams. Similarly, ZA-A-9209810 is concerned with a pumpable, spreadable grouting composition incorporating a cementitious and/or pozzolanic or equivalent material, and its application in sealing fissures and cracks, back-filling, providing mass fills in civil and mining works, or lining tunnels.

Also disclosed in the prior art are hydraulic setting compositions comprising particles of Portland Cement together with fine particles of silica fume containing amorphous silica, which are the subject of EP-A-534385 and are used in the production of concrete, mortar or grout having improved fluidity, whilst GB-A-2187727 describes a rapid gelling, hydraulic cement composition which comprises an acrylic gelling agent, a fine filler and Portland Cement, this composition being thixotropic and finding particular application in the formation of bulk infills for underground mining, and in the filling of voids and cavities in construction or civil engineering. A composition which also is useful in general building and construction work, and as an insulating material comprises a particulate filler, cellulose fibres and a cementitious binder, and is disclosed in GB-A-2117753.

Whilst the majority of these compositions of the prior art have a requirement for the addition of water, EP-A-801124 is concerned with a dry mixture, used for fine soil injection grout preparation, the mixture comprising fillers which do not react with water, cement and deflocculant; on addition of water, an agglomerate-free fine grout is formed, and this is easily injected into fine soil.

Thus, the use of such grouting materials in—primarily—civil engineering is well known. Surprisingly, the present inventors have now found that it is possible to make use of these materials in order to overcome many of the problems associated with encapsulation of fine particulate sized wastes which have previously been detailed. Thus, it is now possible to provide a treatment method for wastes of this type which affords much greater efficiency, convenience and safety in handling, and has a consequent beneficial effect both in terms of environmental considerations and cost.

SUMMARY OF THE INVENTION

Thus, according to the present invention there is provided a method for the encapsulation of fine particulate materials which comprises treating said materials with at least one microfine hydraulic inorganic filler.

Typically, the microfine hydraulic inorganic filler comprises a cementitious material, preferably Portland Cement.

One or more additional inorganic fillers may optionally be added to the cementitious material; suitable fillers include blast furnace slag, pulverized fuel ash, hydrated lime, finely divided silica, limestone flour and organic and inorganic fluidising agents.

In each case, the filler is ground to a much smaller particle size than is normally used in the production of a grout. Typically, the filer has a maximum particle size of less than 10 μm.

The microfine hydraulic inorganic filler is provided in the form of an aqueous composition for the treatment of the fine particulate materials; the water content of the composition is preferably in the region of 40-50% (w/w). Thus, the filler may be pumped under pressure through the materials in order to ensure that they become intimately encapsulated. In this way, the filler is able to fill the very small interstitial cavities in the waste, thereby achieving intimate encapsulation without the need to remove the materials from their container, with all the attendant disadvantages that would be associated with such a procedure. Hence, the method of the present invention may be distinguished over the prior art, since all the shown methods involve the mixing of materials and filler in a container, whereas mixing of the filler into an aqueous composition occurs prior to treatment of the materials in the container in the present case. The intimate encapsulation which is a feature of the present method would not be achievable by using the methods of the prior art.

A further advantage of the present method is that the container in which the fine particulate materials are held may be used as part of the waste packaging.

DESCRIPTION OF THE INVENTION

The method of the present invention may be applied to the treatment of a wide range of fine particulate materials. Of particular value, however, is the application of the method to the treatment of waste materials in general and, most particularly, waste materials which are encountered in the nuclear industry which, as previously discussed, provide particular areas of concern in their disposal. Such materials may be treated by this method in order to eliminate many of the practical handling difficulties, and potential contamination hazards, which would be associated with the need to remove the materials from their containers prior to treatment.

A particular example of the application of the method in the field of nuclear technology involves the treatment of filters containing ion exchange resins. Said filters may typically be used for both liquids and gases and a particular application is in the removal of caesiumn from waste ponds. The used filters comprise cartridges of spent ion exchange resin and these may be successfully encapsulated using the technique according to the present invention.

The invention claimed is:

1. A method for the encapsulation of fine particulate materials comprising:
grinding a hydraulic inorganic filler to provide a ground hydraulic inorganic filler; and
treating the materials with the ground hydraulic inorganic filler, wherein the particulate materials are treated in waste storage containers, without the requirement for removal from the waste storage containers prior to treatment, and the hydraulic inorganic filler is provided in the form of an aqueous composition which is pumped under pressure through the waste materials in order to achieve encapsulation.

2. A method for the encapsulation of fine particulate materials comprising:
treating said particulate materials with a hydraulic inorganic filler, wherein the particulate materials are treated in waste storage containers, without the requirement for removal from the waste storage containers prior to treatment, and the hydraulic inorganic filler is provided in the form of an aqueous composition which is pumped under pressure through the waste materials in order to achieve encapsulation.

3. A method as claimed in claim 2 wherein the hydraulic inorganic filler comprises a cementitious material.

4. A method as claimed in claim 3 wherein the cementitious material comprises Portland Cement.

5. A method as claimed in claim 3 wherein the hydraulic inorganic filler further comprises at least one additional inorganic filler selected from the group consisting of blast furnace slag, pulverised fuel ash, hydrated lime, finely divided silica, limestone flour and organic and inorganic fluidising agents.

6. A method as claimed in claim 5 wherein the filler has a maximum particle size of less than 10 μm.

7. A method as claimed in claim 2 wherein a water content of the composition is in the range of 40-50% (w/w).

8. A method as claimed in claim 2 wherein the fine particulate materials comprise waste materials.

9. A method as claimed in claim 8 wherein said waste materials comprise waste materials generated in the nuclear industry.

10. A method as claimed in claim 2 wherein said waste materials comprise spent ion exchange resins.

11. A method as claimed in claim 2 wherein the container is used as part of the waste packaging.

* * * * *